(12) United States Patent
Yoshida

(10) Patent No.: US 7,366,468 B2
(45) Date of Patent: Apr. 29, 2008

(54) WIRELESS COMMUNICATION APPARATUS CAPABLE OF WIRELESS COMMUNICATION WITH PUBLIC WIRELESS NETWORK AND WIRELESS COMMUNICATION APPARATUS, AND IMAGE COMMUNICATION APPARATUS CAPABLE OF WIRELESS COMMUNICATION WITH WIRELESS COMMUNICATION APPARATUS

(75) Inventor: Shigeo Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 09/945,802

(22) Filed: Sep. 5, 2001

(65) Prior Publication Data

US 2002/0032005 A1    Mar. 14, 2002

(30) Foreign Application Priority Data

Sep. 12, 2000    (JP) ............................. 2000-276928

(51) Int. Cl.
*H04Q 7/20*    (2006.01)
(52) U.S. Cl. .................. 455/41.3; 455/517; 455/456.1; 455/500; 379/100.06; 358/1.15; 348/714
(58) Field of Classification Search ............... 455/41, 455/60, 404, 456, 556.2, 412, 414, 507, 517, 455/519, 422, 412.1, 414.1, 456.1, 500, 41.1–41.3; 725/105; 358/1.15, 1.1–1.8; 348/714; 370/389; 400/62; 379/29.1, 100.01, 100.06
See application file for complete search history.

(56) References Cited

U.S. PATENT DOCUMENTS 6,000,864 A * 12/1999 Hanada ....................... 400/62
6,157,465 A * 12/2000 Suda et al. .................. 358/407
6,181,878 B1    1/2001 Honda ......................... 396/310
6,359,837 B1 *  3/2002 Tsukamoto .................. 368/10
6,490,052 B1 * 12/2002 Yanagidaira ................ 358/1.15
6,493,104 B1 * 12/2002 Cromer et al. ............. 358/1.15
6,515,988 B1 *  2/2003 Eldridge et al. ............ 370/389
6,580,372 B1 *  6/2003 Harris ....................... 340/686.6
6,657,660 B2 * 12/2003 Shiota et al. ................ 348/714
6,681,252 B1 *  1/2004 Schuster et al. ............. 709/227
6,697,165 B2 *  2/2004 Wakai et al. ............... 358/1.11
6,738,628 B1 *  5/2004 McCall et al. ........... 455/456.1
6,782,253 B1 *  8/2004 Shteyn et al. ............. 455/414.1
6,831,682 B1 * 12/2004 Silverbrook et al. ...... 348/207.2
2001/0032335 A1 * 10/2001 Jones
2001/0041056 A1    11/2001 Tanaka et al. ................ 386/95
2002/0058499 A1 *  5/2002 Ortiz .......................... 455/412
2003/0114176 A1 *  6/2003 Phillipps ..................... 455/500

FOREIGN PATENT DOCUMENTS

JP    10-215397 A    8/1998

* cited by examiner

*Primary Examiner*—Fan Tsang
*Assistant Examiner*—M. S. Alam Elahee
(74) *Attorney, Agent, or Firm*—Fitzpatrick, Cella, Harper & Scinto

(57) ABSTRACT

The invention provides an image communication apparatus in which an image input unit for entering image and a portable communication unit capable of wireless connection with a public wireless network are constructed in separate manner and are rendered capable of mutual wireless communication.

2 Claims, 13 Drawing Sheets

DATA FLOW IN IMAGE INPUT UNIT 100

DATA FLOW IN PORTABLE COMMUNICATION UNIT 300

SEQUENCE OF DATA FLOW IN IMAGE TRANSMISSION

IMAGE TRANSMISSION OPERATION IN IMAGE INPUT UNIT 100

IMAGE TRANSMISSION OPERATION IN PORTABLE COMMUNICATION UNIT 300

DATA FLOW AT IMAGE RECEPTION

IMAGE RECEPTION OPERATION IN PORTABLE COMMUNICATION UNIT 300

IMAGE RECEPTION OPERATION IN IMAGE INPUT UNIT 100

DATA FLOW AT IMAGE COMMUNICATION IN SECOND EMBODIMENT

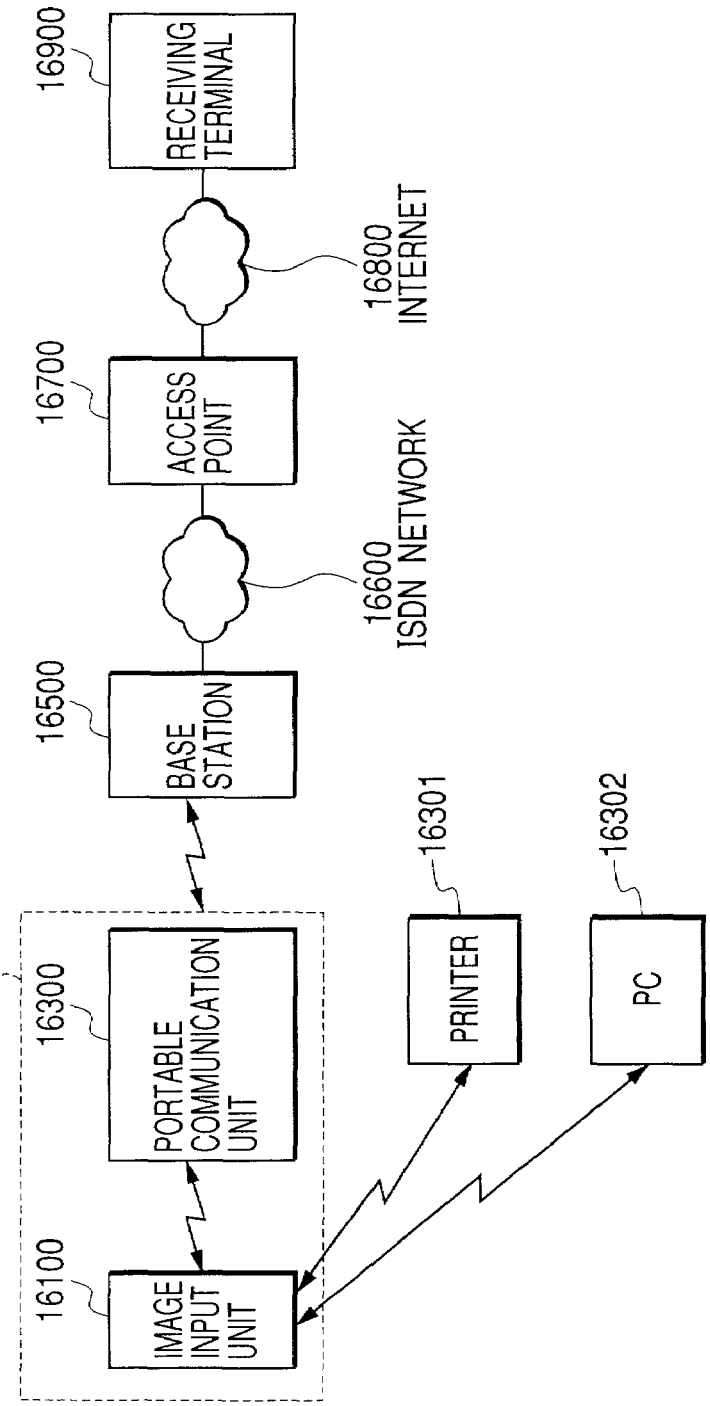

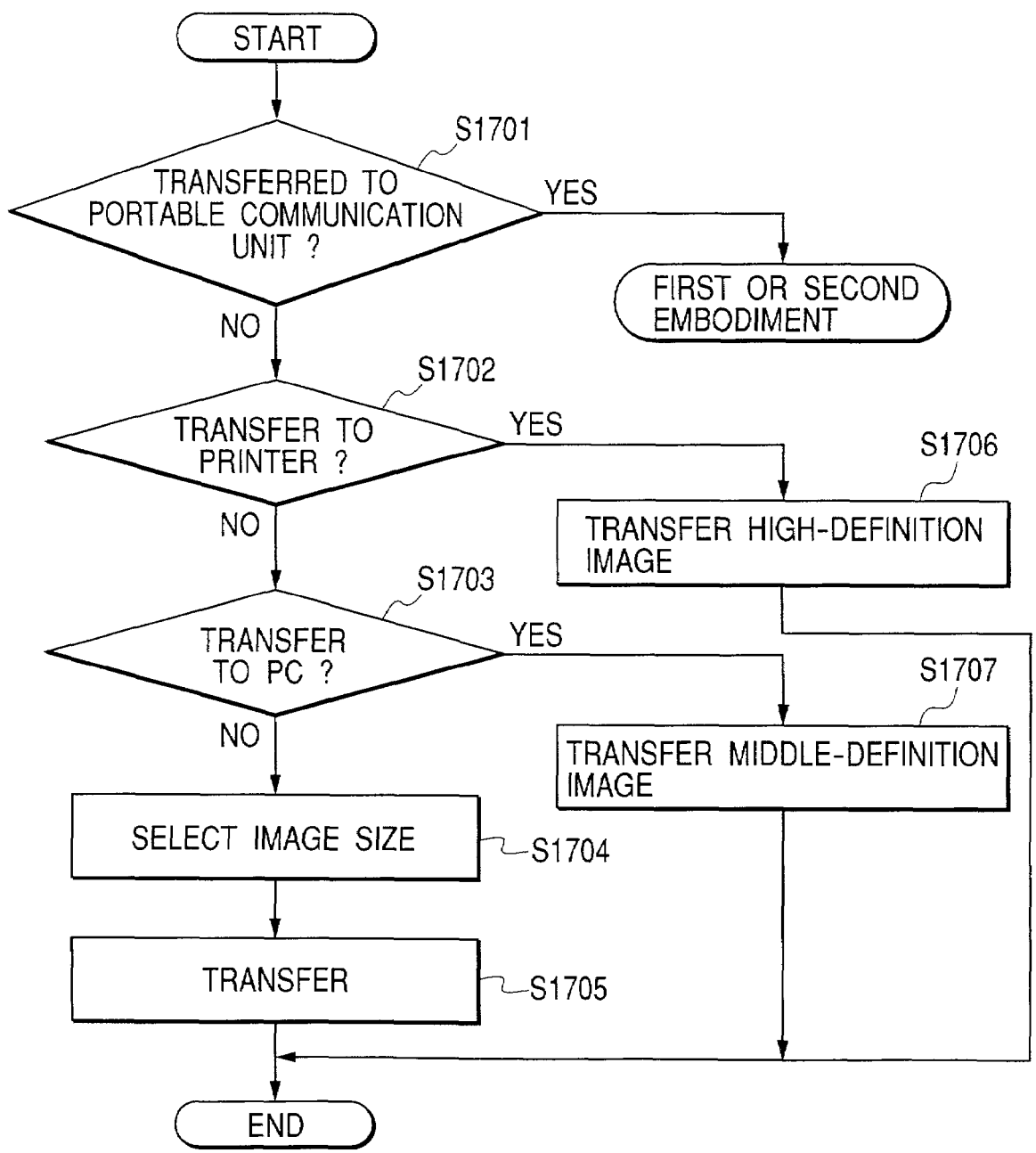

WIRELESS COMMUNICATION APPARATUS CAPABLE OF WIRELESS COMMUNICATION WITH PUBLIC WIRELESS NETWORK AND WIRELESS COMMUNICATION APPARATUS, AND IMAGE COMMUNICATION APPARATUS CAPABLE OF WIRELESS COMMUNICATION WITH WIRELESS COMMUNICATION APPARATUS

BACKGROUND OF THE INVENTION

1. Field of the Invention

The present invention relates to a wireless communication apparatus capable of wireless communication with a public wireless network and wireless communication with an image communication apparatus, and an image communication apparatus capable of wireless communication with a wireless communication apparatus.

2. Description of Related Art

Portable communication apparatus has recently become remarkably popular owing to progress in semiconductor technology, etc. Also, communication by telephone is shifting from calling to a number, to calling to a person.

Also, most portable wireless communication apparatus now has a character mail function and a simplified web browsing function, in addition to voice communication. In consideration of the further improvement in the communication ability of portable wireless communication apparatus of the next generation, it is anticipated that the image taking function and the communication function for such image will play an important role.

It has already been tried to digitize and transmit an image taken with a camera, and its practical value is increasing by the improvement in the communication speed and by the higher image quality in the digital camera. In fact the digital camera is recently showing remarkable progress in its performance and has become capable of taking an image with an image quality close to that of a conventional camera utilizing the silver halide-based photographic film for the printout of so-called L-size. Therefore, in comparison with the time and work required for taking an image with the conventional camera, developing the film and printing the image with a minilab or the like and digitizing and transmitting thus obtained image, it will be far more efficient to transmit the image with a digital camera and a portable wireless communication apparatus.

Also, such image communication with the digital camera and the portable wireless communication apparatus matches the recent trend of the modern society toward diversification of the communication needs and toward multimedia.

However, in order to replace the conventional image communication utilizing digitization of an image obtained with a conventional camera by the digital camera and the electronic mail function, it is necessary to be able to transfer the image data to be transmitted from the digital camera to the personal computer and to transmit thus transferred image data to a desired address by means of the image transmitting function of the personal computer.

In the communication in such form, however, it is necessary to connect the digital camera and the personal computer with a cable and to operate the personal computer, which not only interferes with the convenience of the user but also makes it difficult promptly to transmit the image taken with the digital camera. It has therefore been difficult to execute communication exploiting the prompt operability of the digital camera.

It has also been proposed to incorporate the digital camera function in the portable wireless communication apparatus for achieving the image communication without the mentioned cabling, but such configuration limits the development in the performance of the digital camera despite the rapid progress in the function of the digital camera itself, and, in such integrated configuration, the digital camera has to be carried even in a case where portable wireless communication apparatus alone is utilized without the digital camera function, leading to a limitation on the dimension, weight or usable time of the equipment.

In short, the conventional configuration of utilizing the digital camera and the personal computer for image communication is associated with a drawback that the taken image cannot be immediately transmitted, whereas the conventional integrated configuration consisting of the digital camera and the portable wireless communication apparatus is associated with a drawback of poor portability.

SUMMARY OF THE INVENTION

An object of the present invention is to provide an image communication apparatus capable of immediately transmitting the taken image and excellent in portability.

Another object of the present invention is to improve the operability of an image input device for immediately transmitting the taken image.

Still another object of the present invention is, in enabling immediate transmission of the taken image, to enable transmission of an image matching the recipient and to enable transmission of a suitable image to the recipient.

Still another object of the present invention is to enable immediate transmission of the taken image and to enable transmission with a specified addressee only.

According to one aspect of the present invention is provided a printer apparatus including a reception device adapted to wirelessly receive an inquiry signal which is transmitted by a wireless communication apparatus in order to search surrounding devices, and a transmission device adapted to transmit a response signal to the inquiry signal received by the reception device. The response signal includes information indicating that the printer is a specified printer which is pre-registered in the wireless communication apparatus and information indicating that the printer is operating in a printing process. Moreover, the transmission device does not transmit the response signal in a case where the printer apparatus in operating in a printing process.

Still other objects and features of the present invention will become fully apparent from the following detailed description which is to be taken with the accompanying drawings.

BRIEF DESCRIPTION OF THE DRAWINGS

FIG. 16 is a view showing the configuration of an image communication system 2000 in a third embodiment of the present invention; and FIG. 17 is a flow chart showing the process of an image input unit in the image communication system 2000.

DESCRIPTION OF THE PREFERRED EMBODIMENTS

First Embodiment

Figure 1:
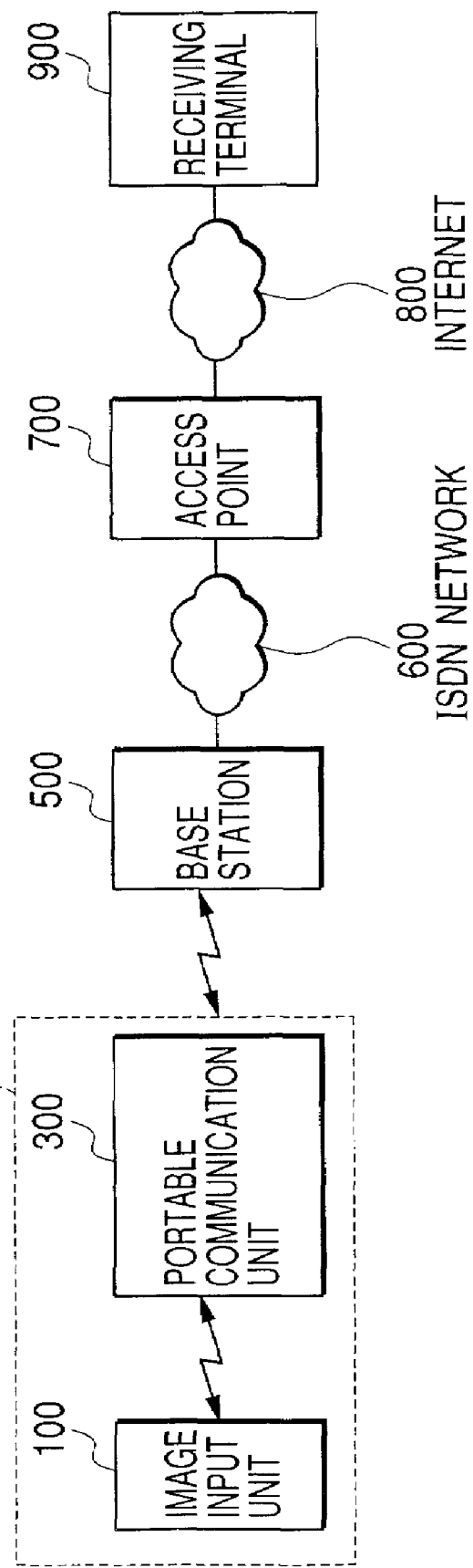
FIG. 1 is a view showing the configuration of an image communication system 1000 constituting a first embodiment of the present invention.

FIG. 1 is a view showing an example of the configuration of an image communication system 1000 constituting a first embodiment of the present invention.

The image communication system 1000 is composed of an image communication apparatus IC1, a base station 500, an ISDN (integrated service digital network) 600, an access point 700, an internet network 800, and a receiving terminal 900.

The image communication apparatus IC1 is provided with an image input unit 100 and a portable communication unit 300.

The image input unit 100 is provided with a digital camera function and a wireless image communicating function. Also, the image input unit 100 may be used singly, namely detached from the portable communication unit 300.

The image input unit 100 and the portable communication unit 300 are both provided with wireless communication means and are capable of mutual communication. In the present embodiment, as such wireless communication means, there is employed the Bluetooth standard for executing transmission in the 2.4 GHz band by the frequency diffusion method.

The portable communication unit 300 is usable also as an ordinary wireless telephone (for example for conversational communication only) and is also capable of image communication with the image input unit 100 in a distant location. Thus the portable communication unit 300 is provided with wireless communication means different from that used between the image input unit 100 and the portable communication unit 300 and capable of accessing a public network. In the present embodiment, the above-mentioned wireless communication means for access to the public network employs a wireless communication method utilizing the PHS (personal handyphone system), but the wireless communication method in the present invention is not limited thereto.

Also, the image input unit 100 constitutes an example of the image input means for image input, provided with the wireless communication function. Moreover, the portable communication unit 300 constitutes an example of the portable communication means capable of wireless connection with the public wireless network. Furthermore, the image input means and the portable communication means are mutually separable.

The base station 500 communicates with the portable communication unit 300 by the PHS method and also converts the data, received from the image communication apparatus IC1 by the PHS method, into data for the ISDN (wired network) 600.

The access point 700 is an access point for the internet provider, and the internet communication can be achieved through the access point 700. Also, the access point 700 communicates with the receiving terminal 900 through the internet network 800.

In the image communication system 1000 of the above-described configuration, information can be transmitted to all the terminals connected to the internet in the world, by an internet protocol such as POP3/SMTP (post office protocol version 3/simple mail transfer protocol).

(Image Input Unit 100)

Figure 2:
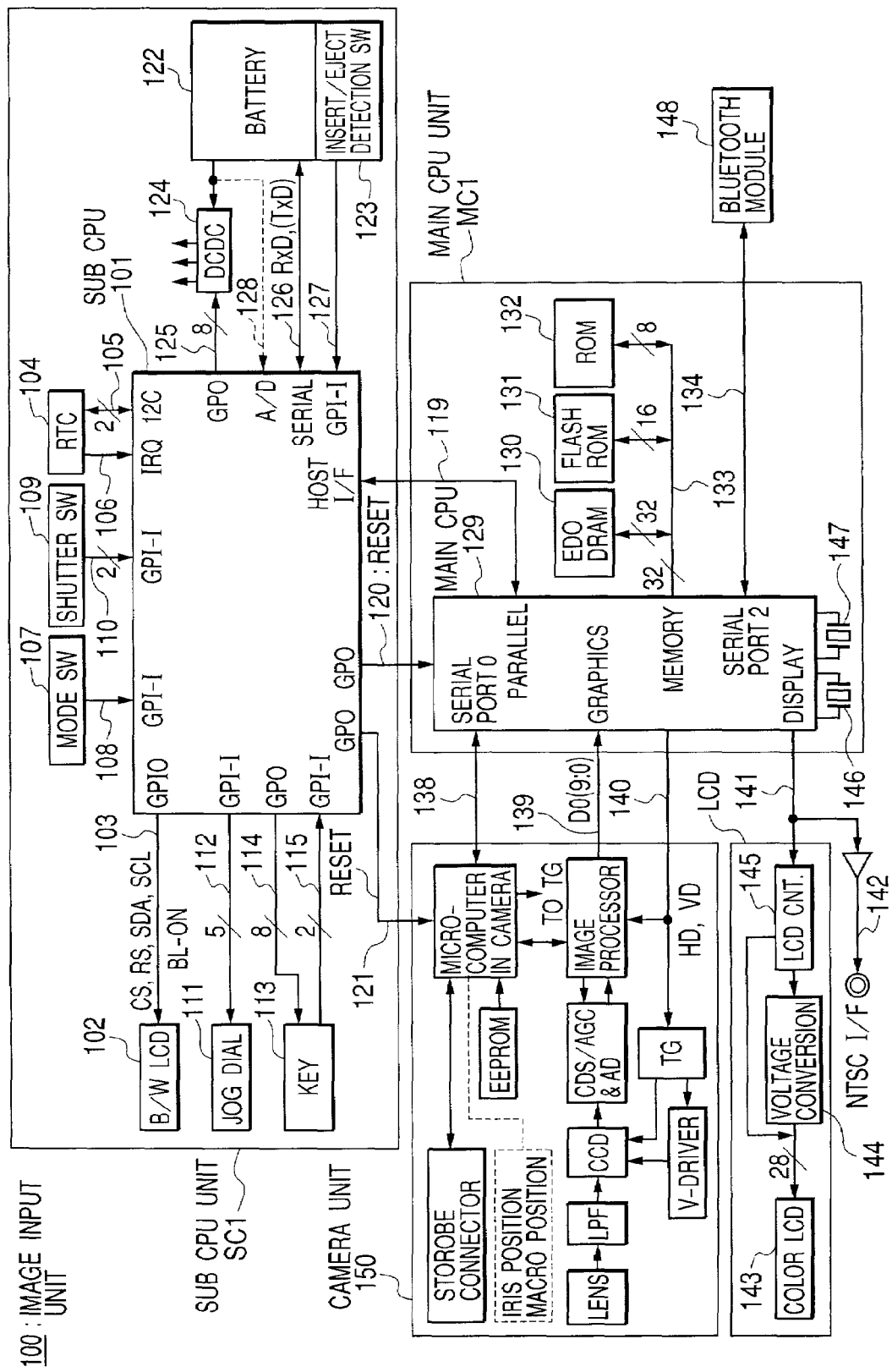
FIG. 2 is a block diagram showing the configuration of an image input unit 100 in the first embodiment.

FIG. 2 is a block diagram showing an example of the configuration of the image input unit 100 in the above-explained embodiment.

The image input unit 100 is provided with a camera unit 150, a main CPU unit MCI, a sub CPU unit SC1, and a Bluetooth module 148.

Figure 3:
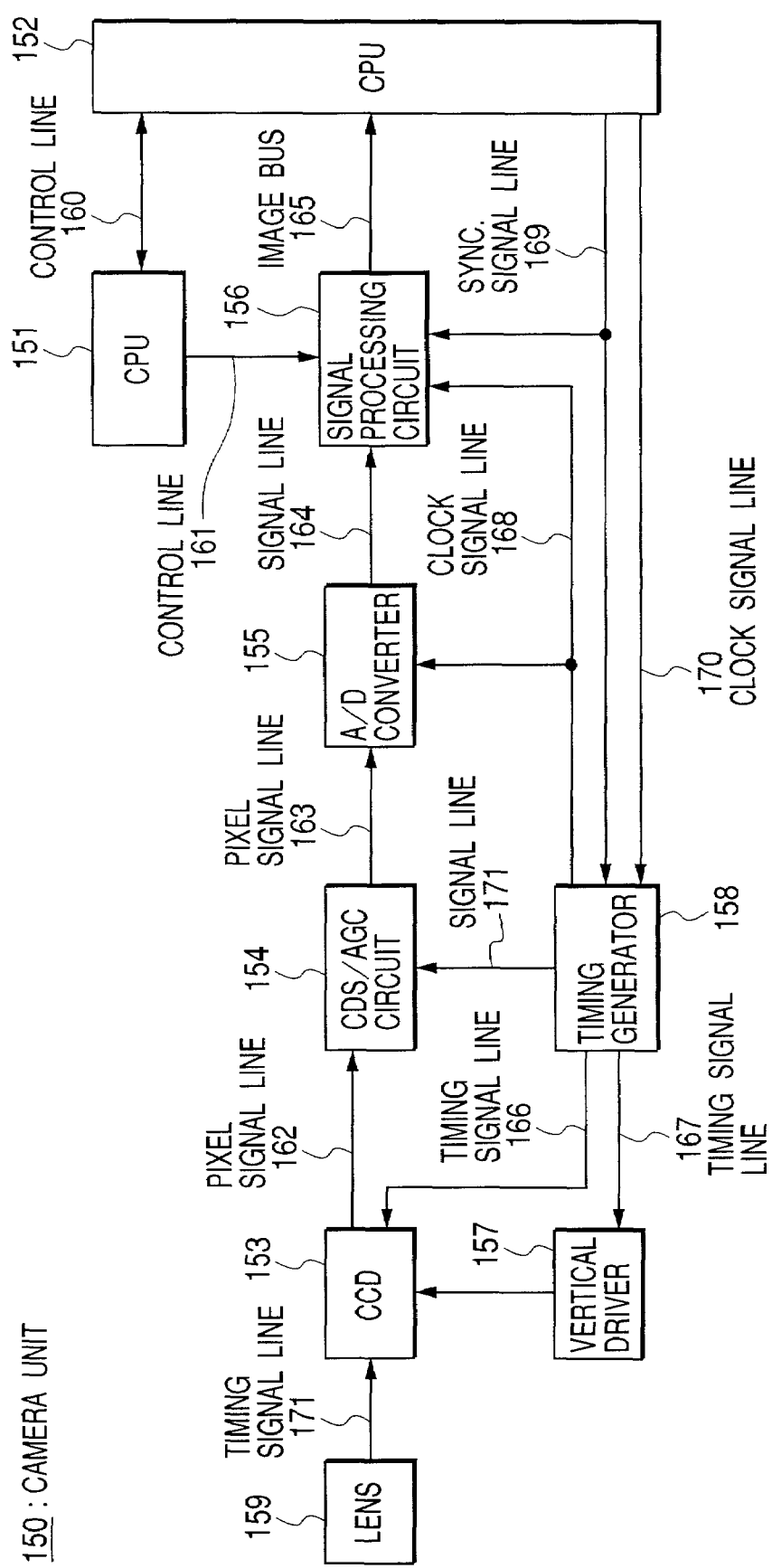
FIG. 3 is a block diagram showing the configuration of a camera unit 150 provided in the image input unit 100 of the first embodiment.

FIG. 3 is a block diagram showing an example of the configuration of the camera unit 150 provided in the image input unit 100.

In the camera unit 150, a CPU 151 controls the camera unit 150 according to a program stored in a memory (not shown), and a CPU 152 controls the entire camera unit 150 according to a program stored in a memory (not shown) and is composed of a composite IC having a memory controller and a serial interface.

A CCD 153 converts optical (image) information into a charge and outputs thus converted charge as an electrical signal. In the present embodiment, the size of the image formed by the CCD 153 is assumed to be 1280 pixels in the horizontal direction by 960 pixels in the vertical direction.

A CDS/AGC (correlated double sampling/auto gain control) circuit 154 executes sampling on the electrical signal transmitted from the CCD 153, thereby controlling the amplitude of the signal.

An A/D converter converts an analog image signal into a digital signal. A signal processing circuit 156 applies correction for example for white balance on the converted digital data, then executes color space conversion from the color space of the CCD into RGB data, and outputs the image data thus subjected to the color space conversion.

A vertical driver 157 converts the voltage amplitude thereby generating a signal for driving the CCD 153, and a timing generator 158 generates a timing signal necessary for the CCD 153 for image formation. A lens 159 transmits and refracts light thereby concentrating the light onto the charge-accumulating surface of the CCD 153.

A control line 160 is used for communication between the CPU 152 and the CPU 151 controlling the entire camera unit 150. A control line 161 is used by the CPU 151, controlling the camera unit 150, for controlling the image processing IC (signal processing circuit) 156, in which an internal register executes reading and writing operations through the control line 161.

A pixel signal line 162 is used for transmitting the image signal, in analog value, from the CCD 153 to the CDS/AGC circuit 154.

A pixel signal line 163 is used for transmitting the image signal, subjected to amplitude control by the CDS/AGC circuit 154, to the AD converter 155. A signal line 164 is used for transmitting the signal, digitized by the AD converter 155, to the signal processing circuit 156. The signal line 164 is composed of 10 data buses.

An image bus 165 is used for transmitting the image signal, converted into YUV format by image processing in the image processing circuit 156, to the CPU 152. The image bus 165 is composed of 8 data buses.

A signal line 166 is used for transmitting the timing signal, used by the CCD 153 as the basis for image formation, from the timing generator 158 to the CCD 153. A signal line 167 is used for transmitting the timing signal (requiring voltage conversion), to the CCD 153 through the vertical driver 157.

A signal line 168 is used for transmitting the clock signal used as the basis of sampling of the pixel signal, and a signal line 169 is used for transmitting horizontal and vertical synchronization signals, generated by the CPU 152, to the timing generator 158. A signal line 170 is used for transmitting a clock signal, generated by the CPU 152 and used as the basis of timing in controlling the entire camera unit 150, to the timing generator 158, and a signal line 171 is used for transmitting a sample-hold timing signal to be given to the CDS/AGC circuit 154.

In the following there will be explained the signal flow among the blocks constituting the camera unit 150.

The IC (CPU) 152 controlling the entire camera unit 150 enters the clock signal into the timing generator 158 through the signal line 170, and the CPU 152 enters the horizontal and vertical synchronization signals into the timing generator 158 through the signal line 169.

In synchronization with thus-entered signals, the timing generator 158 supplies the CCD 153 with the timing signal through the signal line 166, also the vertical driver 157 with the timing signal through the signal line 167, the CDS/AGC circuit 154 with the timing signal through the signal line 171 and the AD converter with the timing signal through the signal line 168.

In synchronization with these timing signals, the CCD 153 outputs the taken image signal as an analog signal composed of 1280 dots in the horizontal direction by 960 dots in the vertical direction. The outputted image signal is sent through the signal line 162 to the CDS/AGC circuit 154 which executes sampling, noise elimination and gain control. The AD converter 155 converts thus processed signal into a 10-bit digital signal and outputs such digital signal to the image processing IC 156 through the signal line 164.

Receiving the digitally converted signal, the image processing IC 156 executes image processing such as white balancing and AE (auto exposure control) on the received signal under the control of the camera microcomputer (CPU) 151, and outputs the thus-processed signal in the 8-bit YUV format to the CPU 152.

The lens 159 is a 3× zoom lens of which the zoom position can be manually moved. When converted into a lens for a camera for a 35 mm film, the lens 159 has a focal length within a range of 34~103 mm. With a Hall element, the lens 159 transmits the lens position to the CPU 151 for various types of image processing.

Again referring to FIG. 2, the sub-CPU unit SC1 communicates with the main CPU 129 of the main CPU unit MCI, thereby exchanging commands and data. The communication is executed by parallel signal transfer through a signal line 119 which is composed of 13 signal lines (8 data buses, an address signal line, an I/O READ signal line, an I/O WRITE signal line, a chip select signal line, and an interrupt signal line).

The sub-CPU unit SC1 is further provided with a reset request signal line 120 for outputting a signal for resetting the main CPU 129, and a reset request signal line 121 for outputting a signal for resetting the camera microcomputer (CPU 151) for controlling the camera unit 150.

Also, the sub-CPU SC1 executes serial transfer of commands and display data through signal lines 103 (SC signal line, RD signal line, SDA signal line and SCL signal line) for displaying various information on an LCD display 102, thereby controlling the display thereon. It also executes on/off control of a back light, provided in the LCD display 102, by a back light ON signal.

The sub-CPU SC1 is also connected with a RTC 104, for generating information on date and time, through an I2C-bus 105 thereby obtaining date and time information.

Furthermore, the sub-CPU SC1 can receive information from a key unit 113, having various switches and a keyboard (key matrix switches).

A mode switch 107 is used by the user for selecting the state of the image input unit 100. More specifically, the image input unit 100 can identify one of three modes, namely a power off state, an image producing state and an image input state (camera in use). Consequently a signal line 108 has three switch input terminals.

A shutter switch 109 is a two-step switch capable of identifying a half-depressed state and a fully-depressed state. Consequently a signal line 110 has two switch input terminals.

A jog dial 111 is used by the user for selecting one of the items displayed on the image of the LCD display 102. The user rotates the dial to shift a cursor on a desired item and pushes in the dial to determine the selected item.

The jog dial 111 can also be inclined to the left and to the right, for example respectively to proceed to a next image and to return to a preceding image. Therefore, a signal line 112 has five switch input terminals in total, including two terminals for identifying the rotating direction of the dial, one terminal for identifying the push-in operation of the dial and two terminals for identifying the inclination to the left or to the right.

The sub-CPU SC1 is further connected with a battery 122 through a RxD serial communication line 126 for receiving information on the remaining battery energy and on the battery (voltage, temperature, etc.) at charging and executes processing according to thus received information. The battery 122 supplies various units with electric power through a DC-DC converter 124.

The sub-CPU SC1 further executes power management by controlling the output (on/off state) of the DC-DC converter 124 through an output terminal 125. It also receives a signal from an attachment/detachment detection switch 123 cooperating with a knob provided on a cover for the battery 122, and executes a power-off process in case the battery 122 is about to be extracted, thereby preventing loss of the data stored in the memory.

The sub-CPU SC1 monitors the battery voltage by receiving the output voltage of the battery 122 through a signal line 128 at an A/D converter input terminal, and executes a protective process in case of detecting an abnormality such as an excessive charging or an excessive discharge.

A main CPU MCI has two serial ports. A signal line 138 connected to a serial port 0 is used in case of communicating with the camera unit 150. The serial port 0 is also used by a CPU chip 129 for sending instructions such as exposure conditions, use of flash light, photographing mode, timing of photographing, etc., to the camera unit 150.

A signal line 134 connected to a serial port 2 is used in data communication with the Bluetooth module 148.

A parallel interface 119 is used for connecting the sub-CPU 101 and the main CPU 129.

The main CPU 129 is a CPU chip used for executing the protocols ordinarily used in the image capturing, adjustment of image data amount, output to display, communication with the camera microcomputer, communication with the sub CPU 101, communication with the Bluetooth module 148, communication with the external host computer and in the Bluetooth module 148.

For executing these processes, the CPU chip 129 is provided with a serial port, a camera unit interface, a display interface, a memory interface, a parallel interface, a general purpose I/O (GPIO), an operation unit, a cache memory, a DMA controller, an interrupt controller, a timer and a compression/decompression engine.

An EDO DRAM 130 is a memory used as the work area for the operating system and the application software.

The present embodiment employs two units of EDO DRAM 130. The EDO DRAM 130 also supports a self-refreshing mode and shifts to a low power consumption state under the control by the memory controller of the CPU 129.

A flash ROM 131 is provided with a NOR type memory and is connected as a hardware interface in a similar manner as in the ordinary SRAM.

The flash ROM 131 is used for storing the image taken by the camera unit, recording the data obtained from the received mails and by the FTP communication and also recording various parameters.

A mask ROM 132 is a memory used for storing the operating system and the programs of the application software. When the power supply to the CPU 129 is turned on or when the resetting is executed, the ROM 132 is selected and the boot strap codes are executed.

Crystal oscillators 146, 147 are used for generating frequencies to be used in the CPU 129. The crystal oscillator 146 is used for the entire system control and the NTSC encoding, and the crystal oscillator 147 is used for signal input from the camera unit 150.

A camera unit interface 139 is used for storing the image signal, transmitted from the camera unit 150, in the CPU 129. The image signal is transmitted after the image processing such as the color space conversion, image interpolation, auto exposure control, auto white balancing, auto focusing control, etc., by the image processor on the raw data of the CCD and is subjected to 4:2:2 formatting. Therefore, there is required a sampling frequency equal to twice of the frequency of the raw CCD data.

A signal line 140 is used for transmitting a horizontal synchronization signal HD and a vertical synchronization signal VD. These signals are transmitted from the main CPU 129 to the image processing TG provided in the camera unit 150 for achieving synchronized storage of the image data.

A display interface 141 is used for transmitting an NTSC signal, outputted from the CPU 129, to an external connector 142 and an LCD controller 145. The LCD controller 145 executes, in cooperation with a voltage-converting device 144, conversion of the NTSC signal into a signal for display on a color LCD 143.

Figure 4:
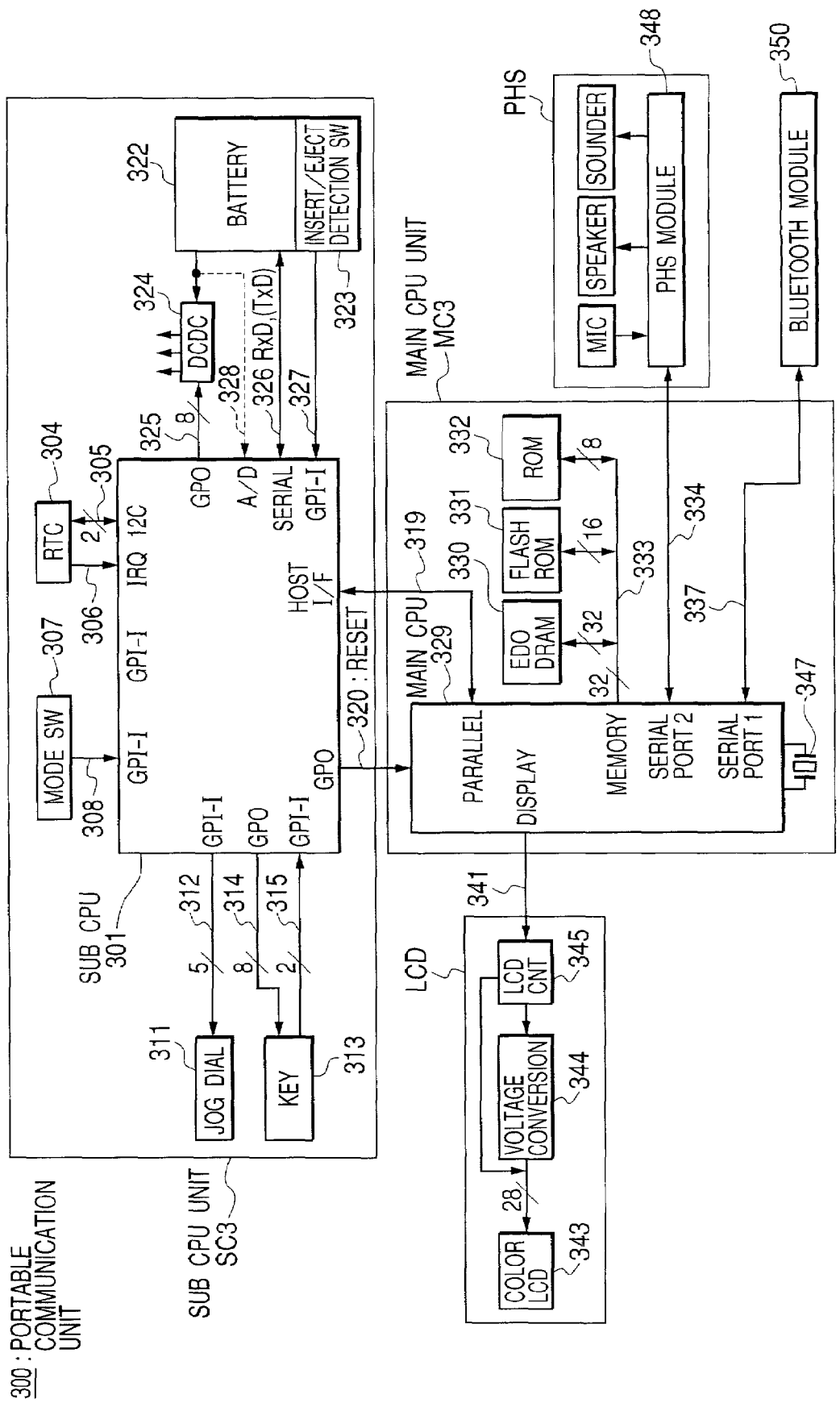
FIG. 4 is a block diagram showing the configuration of portable communication unit 300 in the first embodiment.

FIG. 4 is a block diagram showing an example of the configuration of the portable communication unit 300 in the present embodiment.

A sub-CPU SC3 executes communication with a main CPU 329 of a main CPU MC3, thereby exchanging commands and data. The communication is executed by parallel transfer through a signal line 319, composed of 13 signal lines (8 data BSU lines, an address signal line, an I/O READ signal line, an I/O WRITE signal line, a chip select signal line, and an INTERRUPT signal line).

The sub-CPU SC3 is provided with a reset request signal line 320 for outputting a signal for resetting the main CPU 329, and is also connected with an RTC 304, for generating date and time information, through an I2C-bus 305 thereby obtaining date and time information. Furthermore, the sub-CPU SC1 can receive information from a key unit 313, having various switches and a keyboard.

A mode switch 307 is used by the user for selecting the state of the portable communication unit 300. More specifically, the portable communication unit 300 can identify either a power off state or a communication state.

A jog dial 311 is used by the user for selecting one of the items displayed on the image. The user rotates the dial to shift a cursor on a desired item and pushes in the dial to determine the selected item. This input device (jog dial 311) is used, for example, in selecting a desired address from a telephone book.

A key unit 313 of key matrix type is used for entering telephone numbers and various characters.

The key matrix switch 313 is composed of 8×2 keys, which are scanned by 8 output terminals 314 and two input terminals 315.

The sub-CPU SC3 is further connected with a battery 322 through a RxD serial communication line 326 for receiving information on the remaining battery energy and on the battery (voltage, temperature etc.) at the charging and executes processing according to thus received information. The battery 322 supplies various units with electric power through a DC-DC converter 324.

The sub-CPU SC3 further executes power management by controlling the output (on/off state) of the DC-DC converter 324 through an output terminal 325. It also receives a signal from an attachment/detachment detection switch 323 cooperating with a knob provided on a cover for the battery 322, and executes a power-off process in case the battery 322 is about to be extracted, thereby preventing loss of the data stored in the memory.

The sub-CPU SC3 monitors the battery voltage by receiving the output voltage of the battery 322 through a signal line 328 at an A/D converter input terminal, and executes a protective process in case of detecting an abnormality such as an excessive charging or an excessive discharge.

A main CPU MC3 has two serial ports. A signal line 337 connected to a serial port 1 is used for communication with a Bluetooth module 350.

A signal line 334 connected to a serial port 2 is used in data communication with a PHS module 348.

A parallel interface 319 is used for connecting the sub-CPU 301 and the main CPU 329.

The main CPU 329 is a CPU chip used for executing the protocols ordinarily used in the output to the display, communication with the sub-CPU 301, communication with the Bluetooth module 350 and in the Bluetooth module 148. For executing these processes, the CPU chip 329 is provided with a serial port, a camera unit interface, a display interface, a memory interface, a parallel interface, a general purpose I/O (GPIO), an operation unit, a DMA controller, an interrupt controller and a timer.

An EDO DRAM 330 is a memory used as the work area for the operating system and the application software. For the sake of making the portable communication unit 300 compact, the EDO DRAM 330 does not have a memory capacity matching the display of a large-scale image.

A flash ROM 331 is provided with a NOR type memory and is connected as a hardware interface in a similar manner as in the ordinary SRAM.

The flash ROM 331 is used for storing the image transferred from the image input unit 100 and the data obtained from the received mails and also recording various parameters.

A mask ROM 332 is a memory used for storing the operating system and the programs of the application software. When the power supply to the CPU 129 is turned on or when the resetting is executed, the ROM 332 is selected and the boot strap codes are executed.

A crystal oscillator 347 is used for generating frequencies to be used in the CPU 329. The crystal oscillator 347 is used for the entire system control.

A display interface 341 transmits the signal from the CPU 329 to an LCD controller 345.

The LCD controller 345 executes, in cooperation with a voltage conversion device 344, conversion of the NTSC signal into a signal for display by a color LCD 343.

In the following there will be explained the data flow in the image input unit 100 of the present embodiment.

Figure 5:
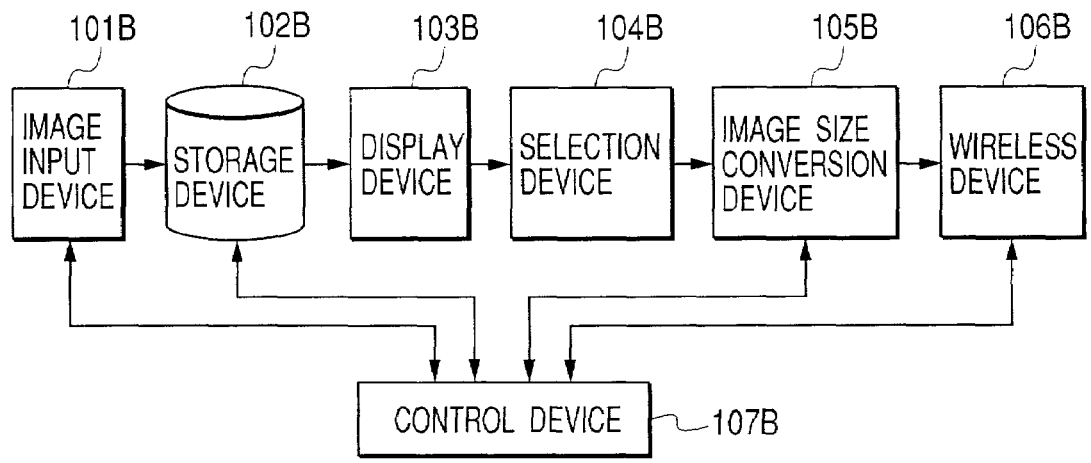
FIG. 5 is a view showing the data flow in the image input unit 100 of the first embodiment.
Figure 6:
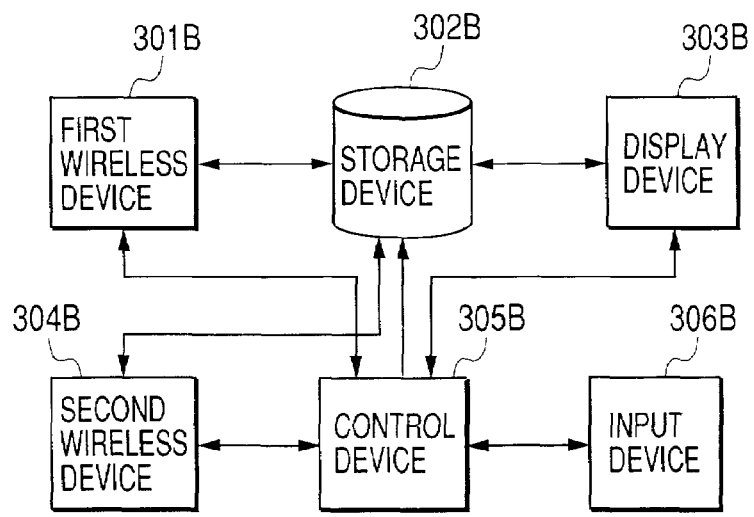
FIG. 6 is a view showing the data flow in the portable communication unit 300 of the first embodiment.

FIG. 5 shows the data flow in the image input unit 100, wherein image input device 101B corresponds to the camera unit 150 in FIG. 2.

Memory device 102B corresponds to the EDO DRAM 130 and the flash ROM 131 in FIG. 2, and stores the image taken by the camera unit 150.

Image conversion device 105B executes conversion to be executed by the CPU 129 shown in FIG. 2, and converts the input image size (for example 1280×960 dots) into an arbitrary size (for example 320×24 dots). Such conversion can be achieved by a known method, such as simple skipping, interpolation by averaging or image encoding.

First wireless communication device 106B corresponds to the Bluetooth unit 148 shown in FIG. 2. Control device 107B corresponds to the CPU 129 shown in FIG. 2 and controls the above-mentioned devices 101B, 102B, 105B and 106B.

Display device 103B is used for displaying the taken image and for selecting the image to be transmitted.

Selection device 104B is used for selecting the image of which the image size is to be changed.

In the following there will be explained the data flow in the portable communication unit 300 in the present embodiment.

First, wireless communication unit 301B is used for wireless communication between the image input unit 100 and the portable communication unit 300 and corresponds to the Bluetooth unit 350 in FIG. 4.

Memory device 302B corresponds to the EDO DRAM 330 and the flash ROM 331 shown in FIG. 2, and is used for storing the image transferred from the image input unit 100 and the data transferred from other terminals. Display device 303B is used for displaying the image obtained by communication and displaying e-mails. Second wireless communication unit 304B is used for wireless communication between the portable communication unit 300 and a base station 500 and corresponds to the PHS module 348 in FIG. 4.

Control device 305B corresponds to the CPU 329 shown in FIG. 4 and controls the above-mentioned devices (301B to 304B) and input device 306B.

The input device 306B is used for entering the address of designation and for making various selections.

In the following there will be explained the sequence of data flow in case of image transmission in the above-described embodiment.

Figure 7:
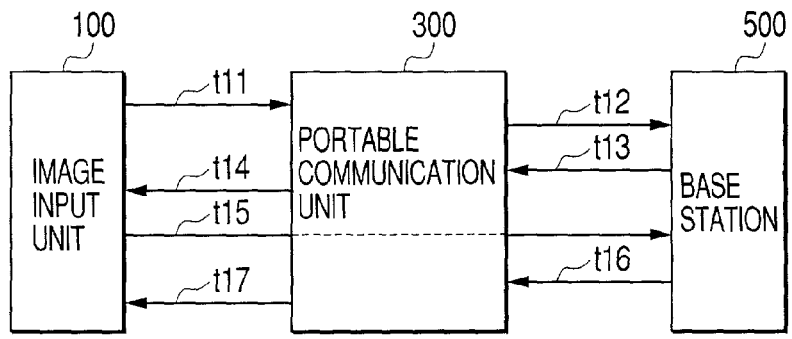
FIG. 7 is a view showing the data flow sequence in case of image transmission in the first embodiment.

FIG. 7 is a view showing the sequence of data flow in case of image transmission in the above-described embodiment.

From the image input unit 100 to the portable communication unit 300, there is transferred a copy (selecting image) of a reduction image (with a reduced number of pixels) prepared in advance so as to reduce the image size (t11).

Then the portable communication unit 300 selects an image to be transmitted, in case there are plural transferred reduction images, utilizing such reduction images, also confirms the images to be transmitted and the layout thereof utilizing such transferred reduction images, further enters the main text of e-mail, selects and enters the address. Then connection is made to a mail server through the base station 500 (t12).

Then the mail server informs the portable communication unit 300 of the completion of preparation for the transmission of the mail text of the mail (t13), and the portable communication unit 300 informs the image input unit 100 of the information on the destination of transmission and the completion of preparation for the transmission (t14).

Based on the information on the destination provided by the portable communication unit 300, the image input unit 100 judges the kind of the transmitter (for example judging a printer or a computer)), and an image matching the information on the destination is transferred to the portable communication unit 300 by Bluetooth communication utilizing the Bluetooth module 350. In this manner the image input unit 100 executes transmission to the base station 500 through the portable communication unit 300. The transfer of the image matching the kind of the destination means, for example, the transfer of a high definition image (image of a high resolution) in a case where the destination is a printer, or the transfer of an image of medium resolution in case the destination is an ordinary computer (t15). In either case, the portable communication unit 300 can at first execute a process of storing the reduction image transferred in the step t11, and can execute image communication without storing a larger image (image of a higher resolution). Then, upon completion of the image communication, an end command reaches from the mail server to the portable communication unit 300 (t16), whereupon the image communication in the image input unit 100 is terminated (t17).

Figure 8:
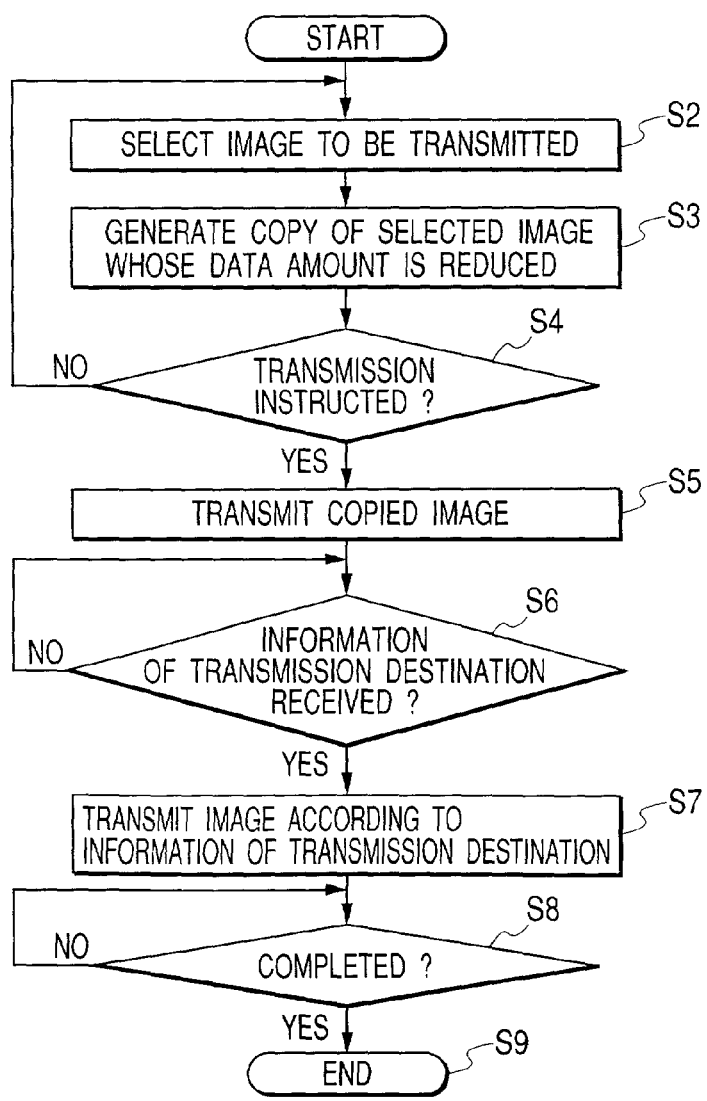
FIG. 8 is a flow chart showing an image transmitting operation of the image input unit 100 in the first embodiment.

FIG. 8 is a flow chart showing the operation of image transmission by the image input unit 100 in the above-described embodiment.

At first the image input unit 100 displays, on the LCD 143, a reduction image of the taken and stored image. The user selects the image to be transmitted utilizing the jog dial 111 and the key unit 113 (S2), and thus selected image is subjected to a change in the number of pixels and a change in the encoding method to produce a copy of the aforementioned image, reduced in data amount for transfer to the portable communication unit 300 (S3).

Then there is monitored whether a command for transmission is given from the user (S4), and, in response to such command, the aforementioned copy image of reduced data amount is transferred to the portable communication unit 300 (S5). In case of transmitting plural images, the sequence returns from step S4 to S2 for selecting another image to be transmitted.

Then there is monitored whether the destination information is transferred from the portable communication unit 300 (S6). Such information means that the portable communication unit 300 has executed the preparation of the e-mail utilizing the image to be transmitted and the selection of the destination and has completed the connection with the communication server.

Then the data amount of the image to be transferred is changed according to the destination information obtained in step S6, and the image is transmitted through the portable communication unit 300 to the base station 500 (S7). For example, in case the original image has a size of 1280×960 dots, such image is directly transmitted if the destination is a printer but the image is transmitted after a change of the image size to 640×480 dots if the destination is a computer. Also, the transmission is made after a change of the image size to 320×240 dots if the destination is a portable communication device.

The aforementioned change of the image size is executed by the image size conversion means 105B on the image stored in the memory means 102B. Such conversion enables efficient communication matching the destination of transmission.

Then there is monitored whether a communication end command has arrived from the portable communication unit 300 (S8), and the sequence is terminated when the communication end command arrives (S9).

In the above-described sequence, the communication from the image input unit 100 to the portable communication unit 300 is executed by the Bluetooth communication utilizing the Bluetooth modules 148 and 350, and the communication from the portable communication unit 300 to the base station 500 is executed by the PHS communication by the PHS module.

Figure 9:
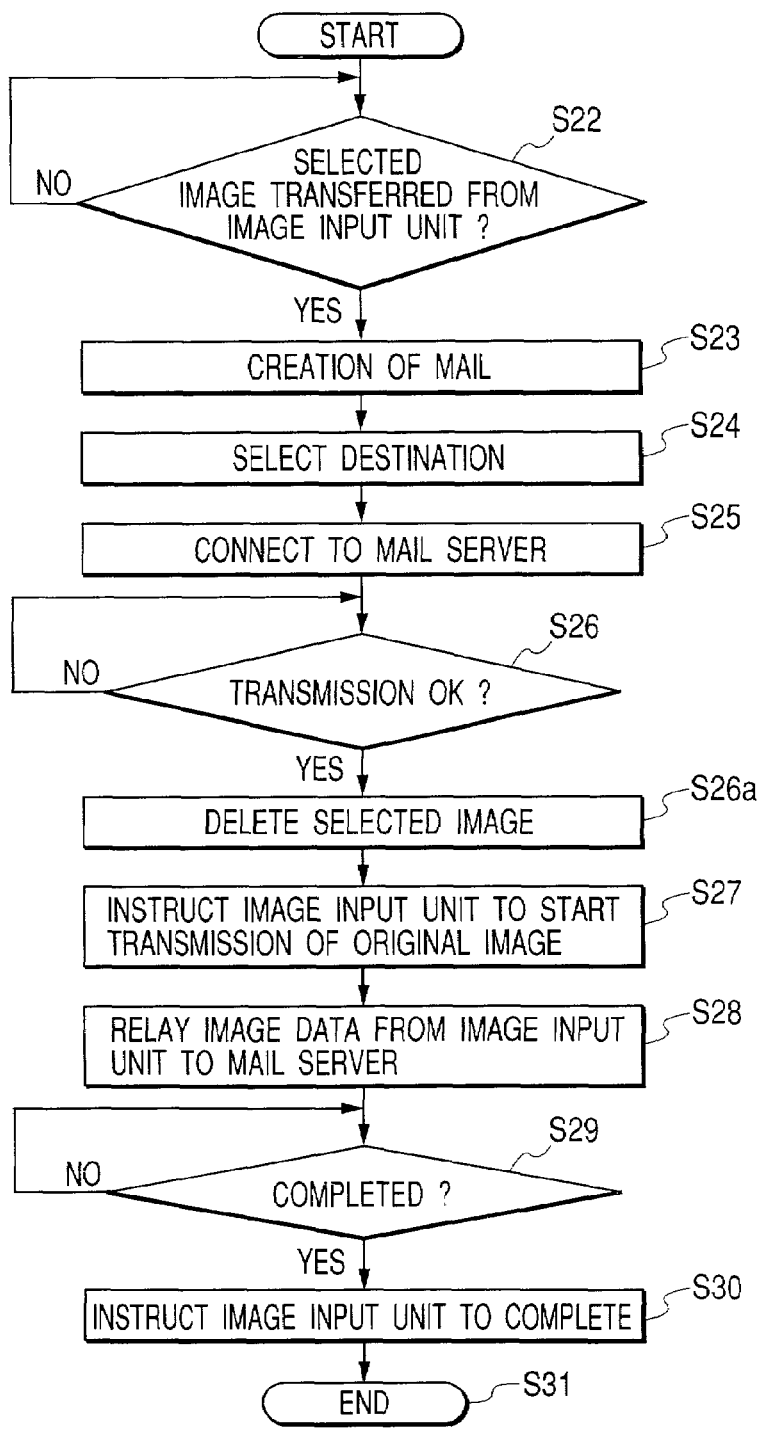
FIG. 9 is a flow chart showing an image transmitting operation of the portable communication unit 300 in the first embodiment.

FIG. 9 is a flow chart showing an image transmitting operation of the portable communication unit 300 in the above-described embodiment.

The portable communication unit 300 monitors whether a reduction image has been transferred from the image input unit 100 (S22), and, if transferred, it prepares an e-mail or a web page utilizing the thus-transferred image (S23).

Then there is selected the destination of transmission (S24), utilizing the telephone list or the past communication record provided in the portable communication unit 300.

Then connection is made with a server such as the mail server for transmission (S25), and there is monitored whether the transmission is possible (S26). If the transmission is possible, the reduction image is erased (S26a) and the destination information and the instruction for image transmission are transferred to the image input unit 100 (S27). In the image transmitting operation, the image data of a large amount are transmitted from the image input unit 100, but the portable communication unit 300 does not store the image data but merely executes a relaying operation in such transmitting operation (S28), whereby the capacity of the memory provided therein can be reduced. Then there is monitored whether the communication with the server has been completed (S29), and, if completed, there is transferred a command for terminating the communication to the image input unit 100 (S30), whereupon the sequence is terminated (S31).

In the following there will be explained the data flow at the image reception in the above-described embodiment.

Figure 10:
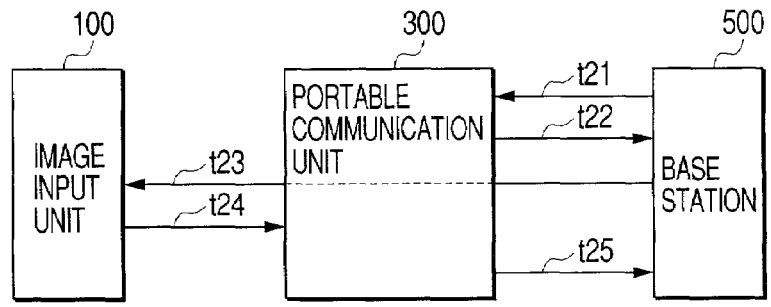
FIG. 10 is a view showing the data flow sequence in case of image reception in the first embodiment.

FIG. 10 shows the data flow at the image reception in the above-described embodiment.

At first the portable communication unit 300 receives a request for reception from the base station 500 including the mail server 500 (t21), and refuses the mail reception itself in a case where the reception is not possible because of an empty memory capacity in the portable communication unit 300 (t22). If the empty memory capacity of the portable communication unit 300 is not limited but the communication state with the image input unit 100 is not satisfactory, the e-mail is received in the portions other than the image and the sequence is terminated, and, if the empty memory capacity and the communication state with the image input state 100 are satisfactory, all the data are received (t22).

Then there is given an instruction for starting the reception from the mail server to the image input unit 100 (t23), and, in the case of an error or termination of the communication, an instruction for ending the communication from the image input unit 100 to the portable communication unit 300 (t24). Then the end of communication is instructed from the portable communication unit to the mail server (t25).

Figure 11:
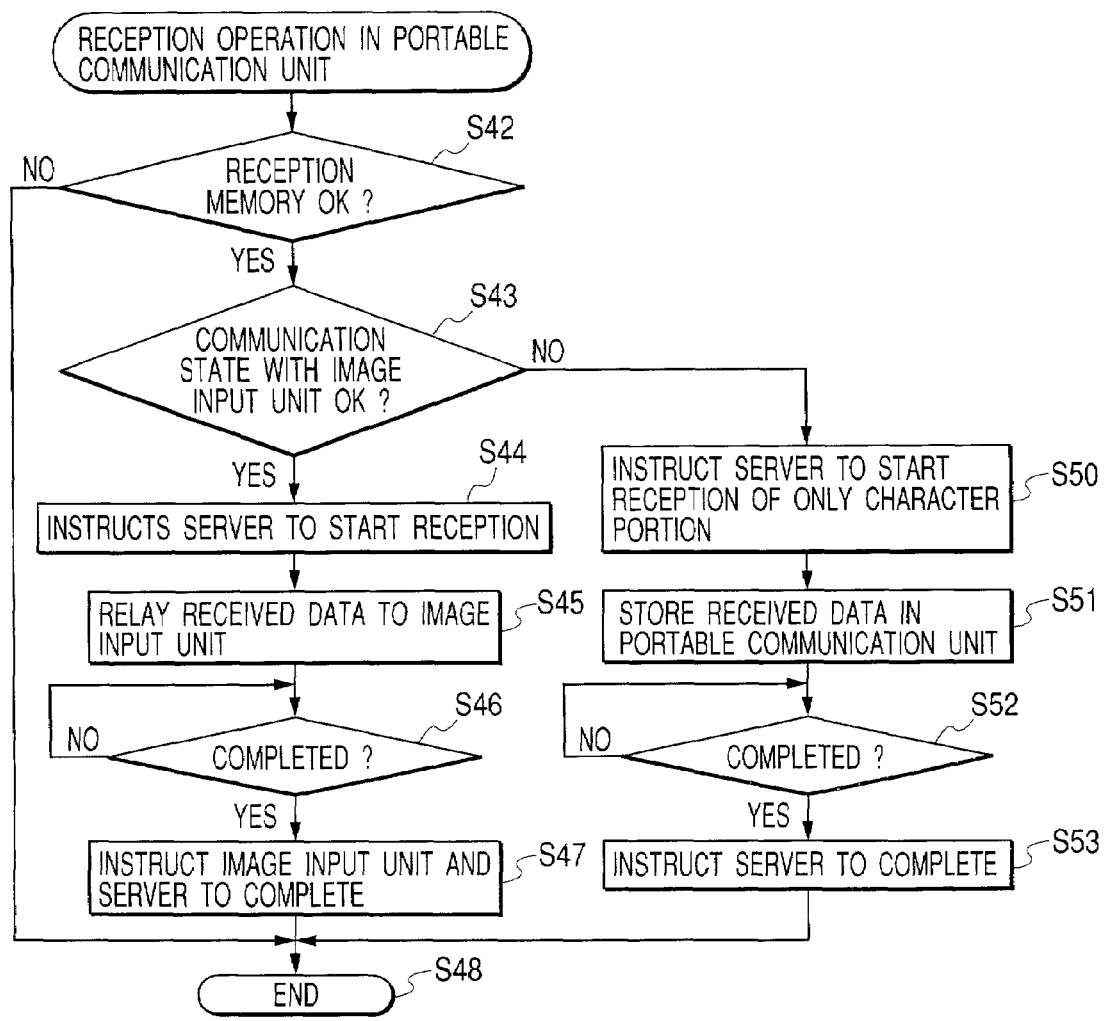
FIG. 11 is a flow chart showing an image receiving operation of the portable communication unit 300 in the first embodiment.

FIG. 11 is a flow chart showing an image receiving operation in the portable communication unit 300 in the above-described embodiment.

Upon receiving a request for reception from the base station 500, the portable communication unit 300 discriminates whether there is a memory capable of storing the reception data (S42), and, if even the character data cannot be stored because of the deficient empty memory capacity, there is informed a rejection for the reception request and the receiving operation is terminated (S48).

On the other hand, if there is a memory capable of storing the reception data (S42), there is checked the state of the Bluetooth communication with the image input unit 100 (S43), and, if the communication state is unsatisfactory, an instruction to start the reception only on the character portion is given to the server (S50) and the received data are stored (S51). The receiving operation from the server is executed solely by the portable communication unit 300 in the steps S50 and S51 and the image input unit 100 does not execute the reception.

On the other hand, if the communication state with the image input unit 100 is satisfactory (S43), an instruction to start the reception is given to the server (S44), and the image data received from the server are relayed and transferred to the image input unit (S45).

Then the completion of the communication with the server (S46) is awaited, and, upon completion of the communication, an instruction for terminating the communication is sent to the image input unit 100 and to the server (S47).

Figure 12:
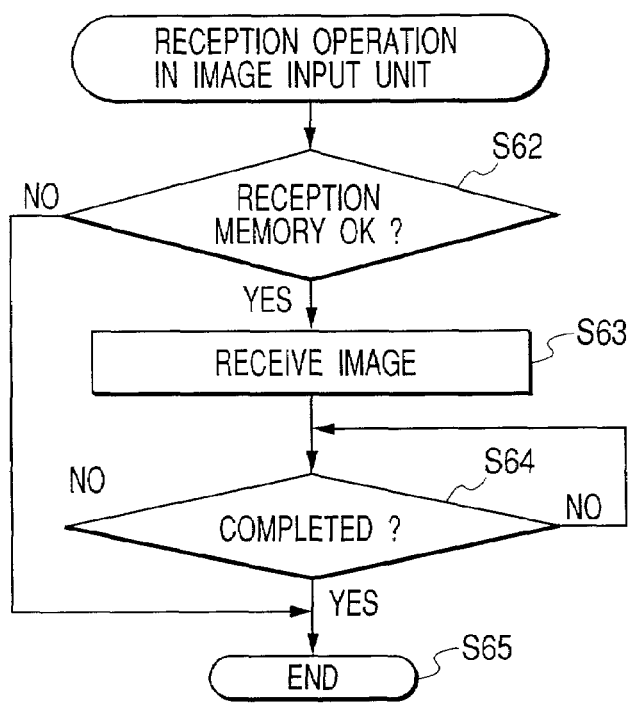
FIG. 12 is a flow chart showing an image receiving operation of the image input unit 100 in the first embodiment.

FIG. 12 is a flow chart showing the image receiving operation of the image input unit 100 in the above-described embodiment.

Upon receiving a request for reception through the portable communication unit 300, the image input unit 100 discriminates whether there is a memory capable of storing the reception data (S62), and, if even the character data cannot be stored because of the deficient empty memory capacity, there is informed a rejection for the reception request to the portable communication unit 300 and the receiving operation is terminated (S65).

On the other hand, if there is a memory capable of storing the reception data (S62), the image data are received from the server through the portable communication unit 300 (S63). Then the completion of the communication with the server (S64) is awaited, and, upon completion of the communication, the sequence is terminated (S65).

The portable communication unit 300 only receives the character data in a case where the communication state between the portable communication unit 300 and the image input unit 100 is not satisfactory, but it is also possible to receive also the image data of a limited data amount from the server in addition to the character data.

In the image communication apparatus IC1, the image input unit 100 such as a digital camera and the portable communication unit 300 are formed as separate casings, and are mutually connected by wireless communication means which is different from the wireless communication means to be used in the communication of the portable communication unit 300 with the public communication network. Consequently the image input unit 100 need not be carried in a case where the image taking function is not required, whereby excellent portability can be ensured, and the configuration of the image input unit 100 can be modified according to the technological progress of the image input unit 100 and that of the wireless communication means connecting the portable communication unit 300 and the base station 500, whereby the system can flexibly adapt to various application software.

Furthermore, since the image input unit 100 such as a digital camera and the portable communication unit 300 are connectable by the wireless communication means, there can be achieved transmission and reception in abrupt (and prompt) manner even in the course of an image taking operation. The use of two wireless communication means is disadvantageous in consideration of the cost of the apparatus, but such drawback in cost can be reduced by employing, as the wireless communication means for connecting the image input unit 100 and the portable communication unit 300, a short-distance communication system based on the frequency diffusion method that can be constructed inexpensively such as Bluetooth.

Moreover, the image communication apparatus IC1 can be constructed inexpensively since the aforementioned controls are realized by the CPU, memory, display means, selection means etc. ordinarily provided in the image input unit 100 and the portable communication unit 300.

Furthermore, in the foregoing embodiment, it is difficult to store the image taken with the image input element of several million pixels in the portable communication unit 300 since the capacity of the image memory mounted therein is limited in order to reduce the dimension and weight the equipment. It is therefore rendered possible to transmit, at first, plural reduction images (thumbnail images) of limited data amount from the image input unit 100 to the portable communication unit 300, then to select the image to be transmitted in the portable communication unit and to instruct the start of transmission of such image from the portable communication unit to the image input unit, thereby achieving communication from the image input unit 100 to the base station 500 through the portable communication unit 300.

The plural reduction images (thumbnail images) of limited data amount from the image input unit 100 to the portable communication unit 300 are transmitted merely for selecting the image to be transmitted, so that such thumbnail images may have a low resolution. After the image to be transmitted is once selected, the portable communication unit 300 merely relays such transmitted image and is not required to store all the image at a time. Also the selection of the image to be transmitted is to be made in the portable communication unit 300.

Also in the image communication apparatus IC1, in the case of executing the image receiving operation, the mode of reception is varied according to the state of the wireless communication means (first wireless communication means) between the image input unit 100 and the portable communication unit 300, whereby there can be achieved such control as to reduce the data amount of the received image or to suspend the reception if the wireless communication between the image input unit 100 and the portable communication unit 300 is difficult owing for example to a long distance or noises.

Also, in the image communication apparatus IC1, the image input unit 100 executes transmission with the data amount of the transmitted image varied according to the type of the destination. For example the data amount of the image is reduced in case the destination of web server or e-mail because the image only needs to be viewed on a display, but the image is transmitted with a larger number of pixels in case transmission to an internet printer in order to enable clearer image output. The data amount of the image can be varied for example by a reduction in the number of pixels or by a change in the image encoding method. The wireless communication means (second wireless communication means) between the portable communication unit 300 connectable to the public network and the base station 500 is expected to become faster in the future but is still often slower than the first wireless communication means between the image input unit 100 and the portable communication unit 300. Also, the communication with an unnecessary number of pixels is undesirable in consideration of the communication cost. Thus there can be obtained an advantage of achieving communication with an appropriate number of pixels to the appropriate destination.

Furthermore, there can be improved the operability in the image communication by the image input unit and the portable communication unit because the reduction image is transmitted from the image input unit to the portable communication unit and is utilized for confirming or selecting the image.

Second Embodiment

The second embodiment is similar in the hardware configuration to the foregoing first embodiment, but is different in the entire control method.

In the second embodiment, the image input unit 100 executes selection of the destination of transmission. Therefore, prior to the transmission, the portable communication unit 300 sends plural destination addresses to the image input unit 100. Then the image input unit 100 selects one of thus sent plural destination addresses, and, as soon as the mail server of the destination becomes ready, transmits the image to the mail server through the portable communication unit 300.

In the first embodiment, after the image to be transmitted is selected by the image input unit 100, the destination is selected by the portable communication unit 300, so that the user has to operate both the image input unit 100 and the portable communication unit 300. On the other hand, the second embodiment provides an advantage of completing the transmitting operation solely by the image input unit 100 since the selection of the destination is also executed in the image input unit 100.

In sending the address information to the image input unit 100, it is not necessary to send all the address information included in the telephone list. It is more efficient to send only the necessary addresses such as those associated with the e-mail addresses.

Figure 13:
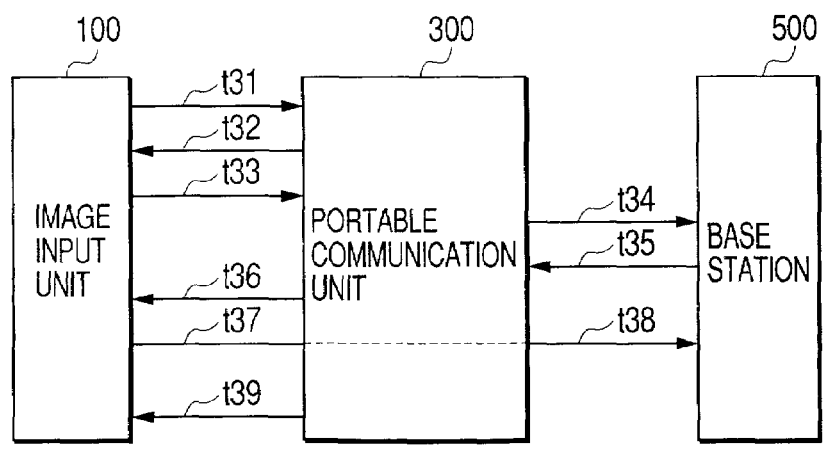
FIG. 13 is a view showing the data flow sequence in case of image transmission in a second embodiment.

FIG. 13 shows the data flow in the image transmitting operation in the second embodiment.

At first the image input unit 100 sends an acquisition request for the destination address information to the portable communication unit 300 (t31). Then the portable communication unit 300 transfers the necessary address information to the image input unit 100 (t32). Then the image input unit 100 prepares an e-mail of an image size matching the destination and sends a relaying request to the portable communication unit 300 (t33).

The portable communication unit 300 sends a request for transmitting the image data to the server (t34), and, when a permission for transmission is given from the server to the portable communication unit 300 (t35), it sends an instruction to start the transmission of the image data to the image input unit 100 (t36). Thus the image input unit 100 transmits the image data to the server through the portable communication unit 300 (t37).

Such control (including relaying) allows the image data to be transmitted without increasing the memory capacity of the portable communication unit 300.

After the completion of transmission, the portable communication unit 300 acquires status information from the server (t38), and the portable communication unit 300 transfers the status to the image input unit 100, whereupon the sequence is terminated.

Figure 14:
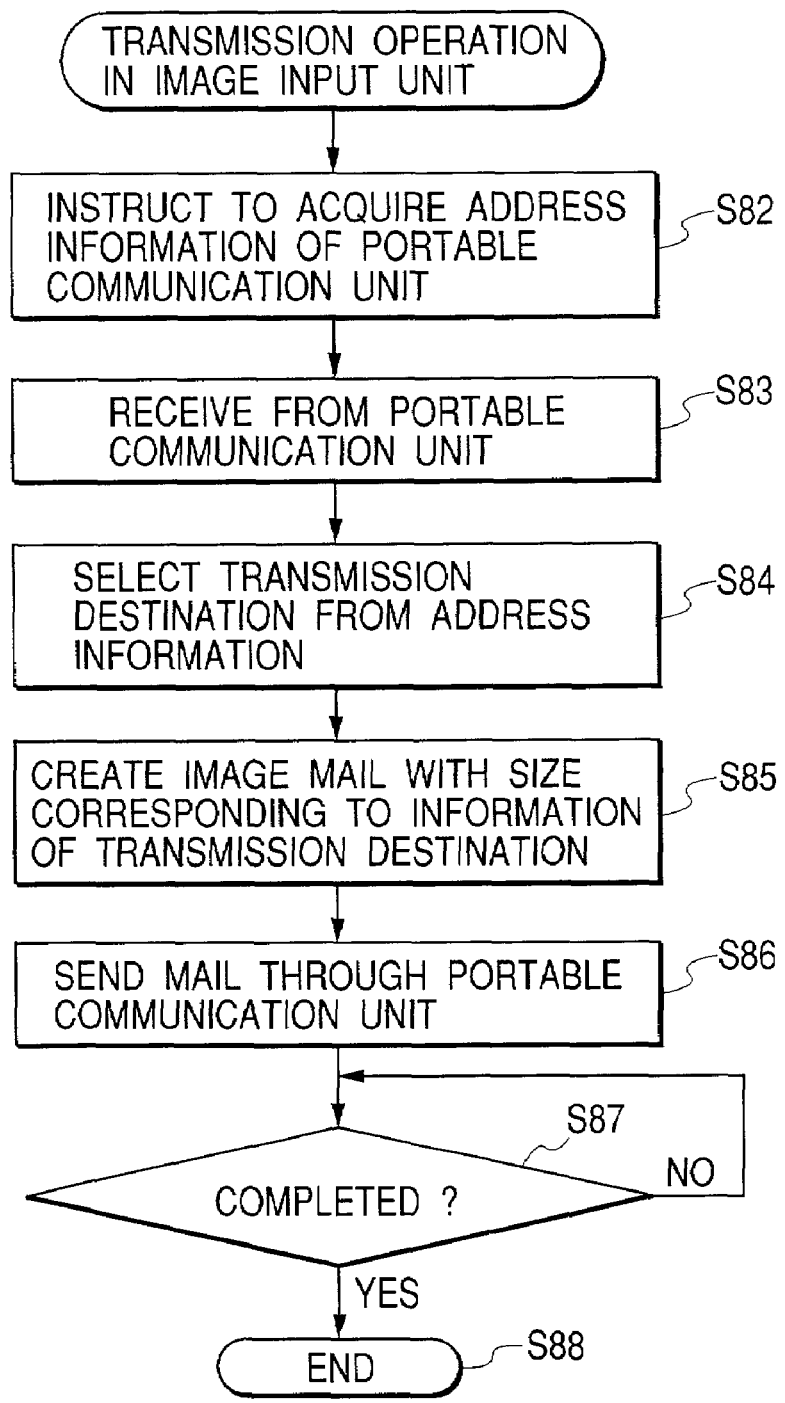
FIG. 14 is a view showing the data flow in case of image transmission in the second embodiment.

FIG. 14 shows an image transmitting operation in the image input unit 100 of the second embodiment.

The image input unit 100 sends a request for acquiring address information group, for obtaining the address information for selecting the destination, to the portable communication unit 300 (S82), and acquires the address information therefrom (S83). Then the destination is selected by the user (S84), and an e-mail is prepared with a variation of the type (resolution) of the attached image according to thus selected destination (S85).

Then the prepared image mail is transferred to the server through the portable communication unit 300 (with relaying by the portable communication unit 300) (S86) and the sequence waits until an end instruction arrives (S87), and the sequence is terminated when the end instruction arrives (S88).

Figure 15:
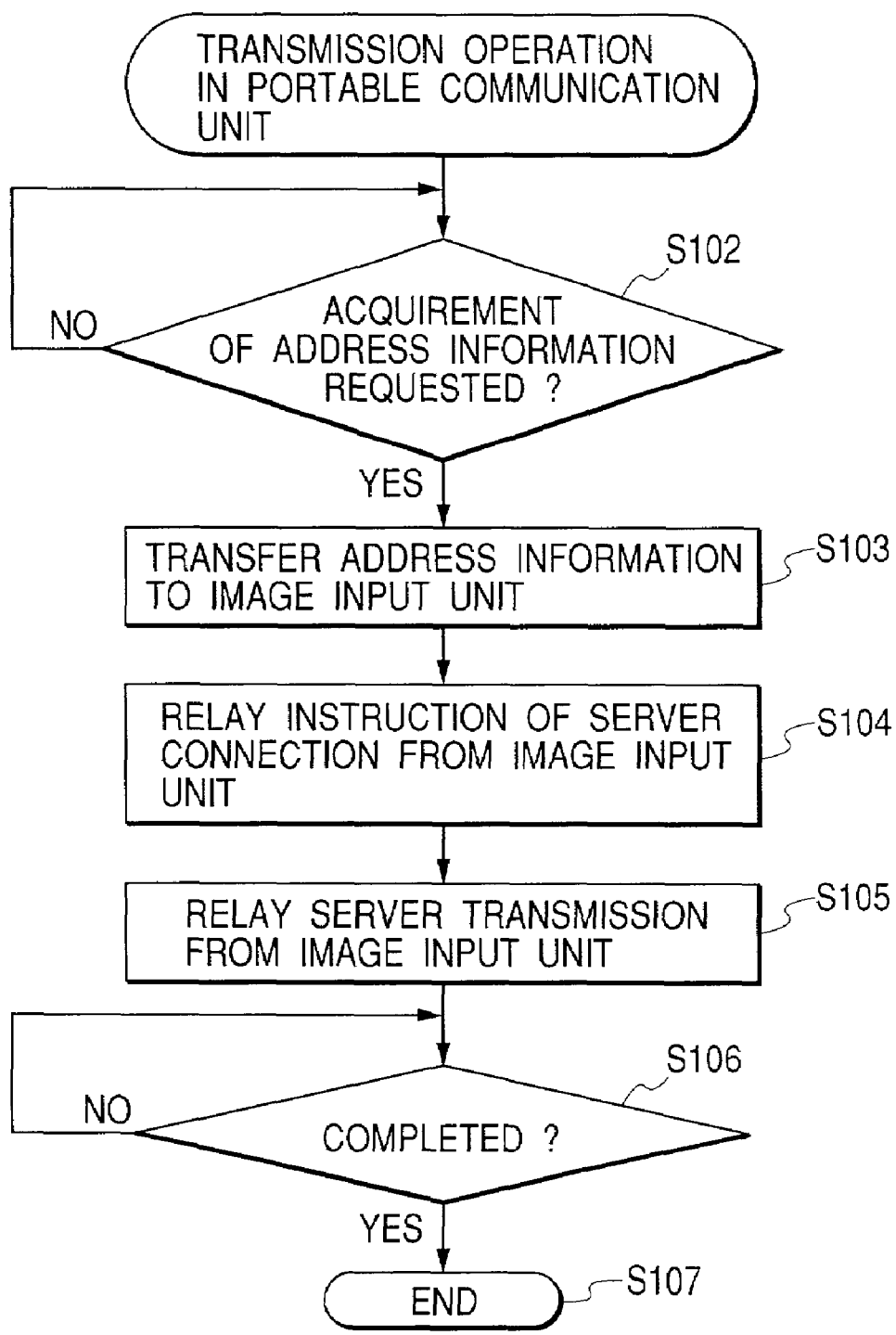
FIG. 15 is a flow chart showing an image transmission control operation of the portable communication unit 300 in the second embodiment.

FIG. 15 is a flow chart showing an image transmission control operation in the portable communication unit 300 of the second embodiment.

When the portable communication unit 300 receives the request for acquiring the address information from the image input unit 100 (S102), it transfers the address information to the image input unit 100 (S103). Then, after the preparation of the e-mail in the image input unit 100, the portable communication unit executes connection to the server in response to an instruction for connection from the image input unit 100 thereby preparing for the e-mail transmission (S104).

Then the portable communication unit 300 transfers the image transmitted from the image input unit 100 and matching the destination in the image size (resolution), to the server (S105). In this operation, instead of storing all the image transmitted from the image input unit 100 and transmitting thus stored image to the server, the portable communication unit 300 transmits the image from the image input unit 100 by merely relaying, so that there is not required a memory capacity for the transmission.

Then the sequence awaits the completion of the communication with the server (S106) and is terminated when the communication is completed (S107).

The foregoing second embodiment can improve the convenience of the user, since the image input unit 100 executes selection on the plural address information transferred from the portable communication unit 300 and utilizes thus selected address information as the address of destination.

More specifically, the image input unit 100, being provided with an image displaying function, can select the image, but is normally not provided with the designation address information. Also since the image input unit 100 and the portable communication unit 300 are connected by the wireless communication means, the freedom is increased with respect to the physical arrangement of the devices, but it is inconvenient to operate both devices. Also, the portable communication unit 300 is normally provided with an address book for transmitting and receiving calls and e-mails. It is therefore rendered possible to improve the convenience of the user by transferring the address information from the portable communication unit 300 to the image input unit 100 and selecting the address information therein.

Third Embodiment

In the foregoing first and second embodiments, the size of the image to be communicated through the portable communication unit and the base station is varied according to the type of the image input unit and the destination.

In the third embodiment, the image size is varied according to the type of the destination to be communicated directly with the image input unit by the Bluetooth communication.

FIG. 16 is a view showing an example of the configuration of an image communication system 2000 constituting a third embodiment of the present invention.

An image communication apparatus IC16 (image input unit 16100, portable communication unit 16300), a base station 16500, an ISDN network 16600, an access point 16700, an internet network 16800 and a receiving terminal 16900 constituting the image communication system 2000 are similar to those constituting the image communication system 1000 shown in FIG. 1 and will not, therefore, be explained further.

A printer 16301 is capable of direct communication with the image input unit 16100 by Bluetooth communication. A personal computer 16302 is capable of direct communication with the image input unit 16100 by Bluetooth communication.

FIG. 17 is a flow chart showing the process of the image input unit in the image communication system 2000.

At first when the image input unit 16100 executes selection of the image to be transferred, designation of the destination and instruction for transfer, a main CPU 129 of the image input unit 16100 identifies the type of the destination (S1701, S1702, S1703). In the third embodiment, the designation of the destination and the identification of the type are achieved by transmitting an inquiry by the Bluetooth communication utilizing the Bluetooth module 148, then displaying the responding devices on the display unit of the image input unit and making designation among such devices. Also, the response to the inquiry includes information indicating the type of the responding device (portable communication unit, printer or PC in the third embodiment). Thus, once the destination is designated, the type of the designated device can be automatically identified.

In a case where the destination of transfer is the portable communication unit, there is executed a process similar to that in the first and second embodiments. Also, in a case where the destination of transfer is the printer 16301, a high definition image (image of high resolution) is transferred through the Bluetooth module 148 (S1706), and where the destination of transfer is the PC 16032, a medium definition image is transferred through the Bluetooth module 148 (S1707). If the destination of transfer is a device not shown in FIG. 16 and the optimum image size is not known, there is given a display for causing the user to select the image size, and, when the image size is selected by the user (S1704), an image of the selected size is transferred (S1705).

As explained in the foregoing, the third embodiment allows transfer of the image with a size matching the destination, in a case of image transfer from the image input unit. If the size optimum for the destination is not clear, the size can be selected by the user.

Fourth Embodiment

In the foregoing embodiment, the image input unit can communicate with the portable communication unit, printer and PC, but, in the fourth embodiment, the image input unit can communicate only with the printer.

In this case, the Bluetooth modules of the image input unit and the printer are so set as to be capable of communication one the other. Thus, when the image input unit transmits an inquiry and if the response signal thereto includes information indicating a specified printer (for example information specifying the manufacture of the device or indicating the registration in advance in the image input unit), there is formed a piconet of Bluetooth communication only with the printer having transmitted the aforementioned signal, thereby enabling image transmission.

In this manner the image input unit can communicate only with a specified printer, regardless of other devices with the Bluetooth modules, thereby avoiding the error of mistaking the destination of the image. It is also possible to dispense with the toil of selecting the destination of image transfer.

Furthermore, in a case where the image input unit can communicate only with the specified printer and if such printer is in the course of printing the image transferred from the image input unit or has started the printing process though the printing operation itself has not been started, or in a case where the image input unit can communicate only with the specified printer which can also communicate with other devices and if such printer is in the course of printing the image transferred from another device or has started the printing process though the printing operation itself has not been started, the response signal to the inquiry from the image input unit may include information indicating that the printing operation is in progress, whereby the user can be helped to avoid a misunderstanding that might result in an erroneous operation even if the printed image is different from the image transmitted from the image input unit.

Also, in order to avoid such misunderstanding, it is also possible simply not to respond to the inquiry while the printer is executing the printing operation or is in the course of the printing process.

The present invention can provide an image communication apparatus of excellent portability, capable of immediately transmitting the taken image, and the operability of the image input device can be improved since the taken image can be immediately transmitted.

Moreover, an appropriate image can be transmitted to the destination since an image matching the destination can be transmitted in immediate transmission of the taken image, and the taken image can be transmitted immediately, since the communication can be made only with the specified partner.

What is claimed is:

1. A printer apparatus comprising:
    a reception device adapted to wirelessly receive an inquiry signal which is transmitted by a wireless communication apparatus in order to search surrounding devices; and
    a transmission device adapted to transmit a printer status response signal to the inquiry signal received by said reception device wherein the printer status response signal includes information indicating that the printer is a specified printer which is pre-registered in the wireless communication apparatus, and
    wherein said transmission device does not transmit the printer status response signal while said printer apparatus is operating in a printing process even if said printer apparatus receives the inquiry signal by said reception device.

2. A control method for a printer apparatus comprising:
    a reception step for wirelessly receiving an inquiry signal which is transmitted by a wireless communication apparatus in order to search surrounding devices; and
    a transmission step for transmitting a printer status response signal to the inquiry signal received in said reception step, wherein the printer status response signal includes information indicating that the printer is a specified printer which is pre-registered in the wireless communication apparatus, and
    wherein said transmission step is not performed to transmit the printer status response signal while the printer apparatus is operating in a printing process even if said printer apparatus receives the inquiry signal by said reception device.

* * * * *